United States Patent

[11] 3,589,099

[72] Inventor Robert C. James
Sheboygan, Wis.
[21] Appl. No. 800,818
[22] Filed Feb. 10, 1969
[45] Patented June 29, 1971
[73] Assignee Hayssen Manufacturing Company
Sheboygan, Wis.
Continuation of application Ser. No. 649,399, May 12, 1967, now abandoned, which is a division of application Ser. No. 432,307, Feb. 12, 1965, now Patent No. 3,362,128.

[54] APPARATUS FOR PACKAGING ARTICLES
6 Claims, 10 Drawing Figs.

[52] U.S. Cl. .......... 53/124, 53/388
[51] Int. Cl. .......... B65b 13/20
[50] Field of Search .......... 53/124, 184, 24, 30, 388; 100/93 P

[56] References Cited

UNITED STATES PATENTS

| | | | |
|---|---|---|---|
| 2,962,848 | 12/1960 | Wilson .......... | 53/124 |
| 3,063,215 | 11/1962 | Parks .......... | 53/388 |
| 3,233,387 | 2/1966 | Spolsino .......... | 53/184 X |
| 3,309,835 | 3/1967 | Peppler .......... | 53/184 X |

*Primary Examiner*—Travis S. McGehee
*Attorney*—Hill, Sherman, Meroni, Grass and Simpson

ABSTRACT: Apparatus for packaging or consolidating individually packaged articles having a heat shrinkable outer wrapper includes the combinations of a conveyor means transporting the articles, compressor means, either alone or associated with said conveyor means, compressing the articles being conveyed and/or compressed to shrink the wrapper into conformity with the tightly packed stack.

INVENTOR
ROBERT C. JAMES

BY Hill, Sherman, Meroni, Gross & Simpson
ATTORNEYS

INVENTOR
ROBERT C. JAMES

BY
Hill, Sherman, Meroni, Gross & Simpson
ATTORNEYS

APPARATUS FOR PACKAGING ARTICLES

This application is a continuation of Ser. No. 649,399 filed May 12, 1967, now abandoned, which is in turn a division of application Ser. No. 432,307, filed Feb. 12, 1965, now U.S. Pat. No. 3,362,128.

The present invention relates to a method and apparatus for packaging or consolidating individually packaged articles, particularly food articles. It also relates to an improved package of substantially greater rigidity and load bearing capabilities than presently available.

Many types of products are currently being sold in multiunit packages, such as individual boxes of breakfast cereals, Heretofore, some means has had to be provided for rigidifying such a package, since the outer wrapper itself could not be drawn about the assembled units sufficiently tightly so that a rigid package would result.

The method and apparatus of the present invention overcome these difficulties and provide a consolidate composite package of improved rigidity, and composed of a compressed stack of aligned individual packages which are held in compressed relationship by a heat shrinkable film about the periphery of the packages.

In general, the method of the present invention involves wrapping a heat shrinkable film about an aligned stack of the packaged articles, compressing the resulting wrapped stack to rigidify the same, but short of the point where crushing of the packages might occur, and heating the resulting wrapped stack while the stack is under compression to shrink the film into conformity with the stack and hold it in its compressed condition.

An object of the present invention is to provide an improved method for consolidating a plurality of individually packed articles into a package which is quite rigid and therefore has substantially greater load bearing properties.

Another object of the invention is to provide a method for economically consolidating a number of individual packages into a rigidified stack.

Still another object of the invention is to provide an apparatus for compressing a stack of aligned packaged articles and then shrinking a heat shrinkable film about the same to conform to the stack and hold the stack in compressed relation.

Still another object of the invention is to provide an improved consolidated package containing a plurality of individually packaged articles.

The present invention makes use of the technique of compression bundling and, to that extent, it is similar to the subject matter of Wilson U.S. Pat. No. 2,962,848 owned by the assignee of the present application. In the aforementioned patent, there is described a method and apparatus for compression bundling which was designed to eliminate the need for providing heavy corrugated or fiberboard cartons of shipping cases for small product packages. Generally, the method involved conveying a group of individual packages and compacting the same into tight rows to thereby form a tight block, projecting the compacted block of unit packages adjacent a flexible wrapping sheet, draping the wrapping sheet over the block, and folding and securing the wrapping sheet about the block while the block was still being maintained in a compacted condition. The method and apparatus of the present invention make use of some of the techniques and equipment which are described in the aforementioned Wilson patent, but differ substantially therefrom in the nature of the wrapper used to hold the individual units in compressed condition.

The wrapping materials used in accordance with the present invention are heat shrinkable films, normally composed of a thermoplastic resinous material which has been oriented at least in one direction by stretching during its process of manufacture to render it shrinkable by heat. A cast or extruded film can be stretched to align the molecules into a more orderly pattern, giving the film increased strength and thoroughness as well as shrinkability. In some cases, the film may be biaxially oriented to provide equal shrink in both the longitudinal and transverse dimensions of the film. The orientation also serves to increase the resistance to cold cracking of the film, so that it retains its flexibility at low temperatures.

One of the particularly preferred materials for use in accordance with the present invention is a biaxially oriented polyvinyl chloride film. This material will shrink a maximum of about 60 percent at 325° F. With a source of hot air as the heating medium, the film is normally heated to 300° to 310° F. with a dwell time of about 2 to 5 seconds.

While polyvinyl chloride represents the preferred embodiment of the present invention, other heat shrinkable polymers can also be employed, such as oriented polyvinylidene polymers, vinyl-vinylidene copolymers, rubber hydrochloride, polyethylene, polypropylene, and polyester films such as "-Mylar" (polyethylene terephthalate).

The wrapping of the multiunit package can be accomplished in several different ways. For one, a plurality of stacked individual units may be first wrapped in the heat shrinkable film, and then subjected to compression to rigidify the rows of packages, after which the compressed array can be subjected to heat which causes the overlying film wrapper to shrink and conform to the compressed package units. Alternatively, the compression and heating may be accomplished as part of a substantially simultaneous operation. Other features of apparatus and method will be described in conjunction with the attached sheets of drawings in which:

AS SHOWN IN THE DRAWING

Figure 1:
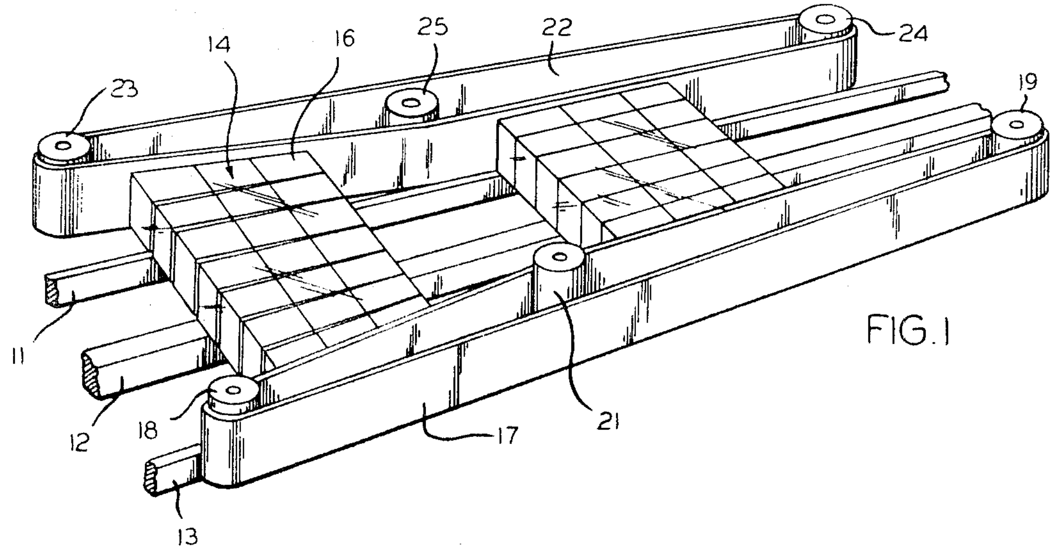
FIG. 1 is a fragmentary view in perspective of a conveying mechanism which may be used to compress the articles.
Figures 2, 3:
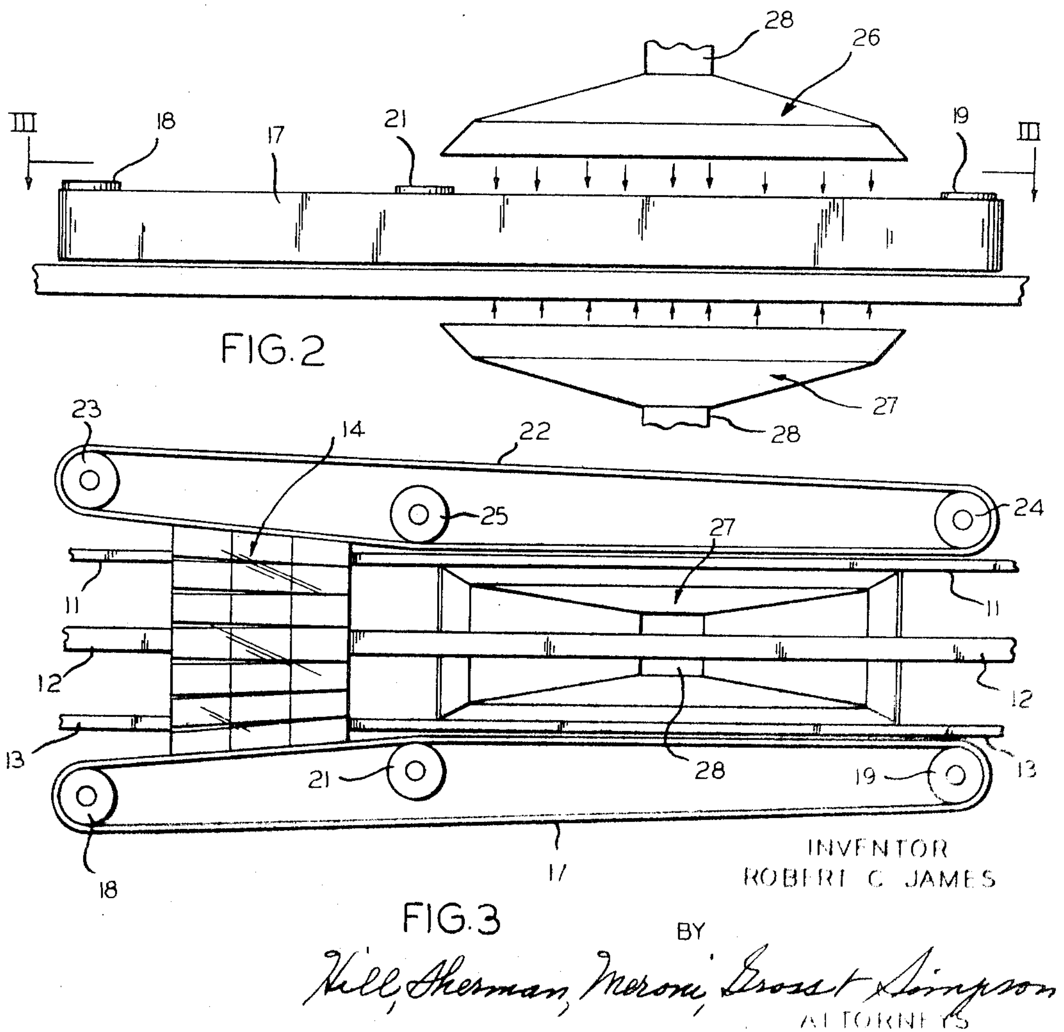
FIG. 2 is a view in elevation, partly schematic, of a heating means which may be used in conjunction with the conveying means of FIG. 1.
FIG. 3 is a plan view of the conveyor and heating mechanism taken substantially along the lines III–III of FIG. 2.

In FIG. 1, there is illustrated a conveying mechanism including a plurality of bottom rails 11, 12 and 13 for slidably supporting the wrapped packages for movement therealong. The packages in the specific illustration shown in FIG. 1, and identified at reference numeral 14, include three rows of unit packages 16, with seven packages in a row. The entire bundle of packages, 21 in all, were wrapped with an overwrap of a heat shrinkable film conforming as tightly as possible to the contour of the package. A compression belt 17 is trained about a pair of rollers 18 and 19 supported on vertical axes, with an intermediate roller 21 engaging the belt 17 intermediate the rollers 18 and 19. Similarly, a compression belt 22 is mounted for movement on the other side of the conveying means, the belt 22 being driven from vertically supported rollers 23 and 24 with an intermediate roller 25 being positioned to engage the inner surface of the belt 22 intermediate the rollers 23 and 24. The spatial arrangement is such that the belts 17 and 22 provide a relatively wide gap at the inlet end, the left side of the showing of FIG. 1, but the positioning of the rollers 19, 21, 24 and 25 is such that the gap narrows as the belts propel the packages in the forward direction, whereupon the belts 17 and 22 exert a substantial compressive force on both sides of the package 14, causing a significant amount of compression to take place. This compression, of course, is short of the force which would crush or mutilate the packages, but is sufficient to rigidify the units substantially, thereby making the composite package of the individual units considerably more resistant to buckling. The heat shrinkable wrapper film, being relatively limp, does not compress to a significant degree in this stage, but, as illustrated in FIG. 2, it is thereupon subjected to a heat treatment by means of hot air distributors 26 and 27 located above and below the conveyor system, respectively. Each of the heating means includes an inlet conduit 28 which directs a stream of hot air at the heat shrinkable film on the conveyor as best illustrated in FIG. 2 of the drawings. Normally, only a few seconds dwell time is required for the heat shrinkable film to shrink into conformity with the compressed individual packages. The shrink fit thus provided effectively holds the compressed unit packages in their compressed form.

Most heat shrinkable materials are also inherently heat sealable. Thus, it is advisable to provide the initial wrap of the film over the packages with overlapping edges which can be heat sealed together simultaneously with the shrinkage of the film about the compressed packages. Alternatively, of course, the package can be sealed by the use of adhesives, solvents, or the like. With some types of shrinkable film, it is desirable to maintain the compression on the packages until all of the heat has been dissipated from the film, to render the film stable enough to withstand the forces within the package.

Figure 4:
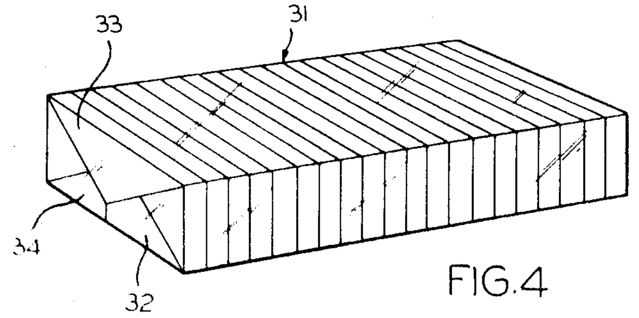
FIG. 4 is a view in perspective of a wrapped stack of unit packages prior to compression.
Figures 5, 6:
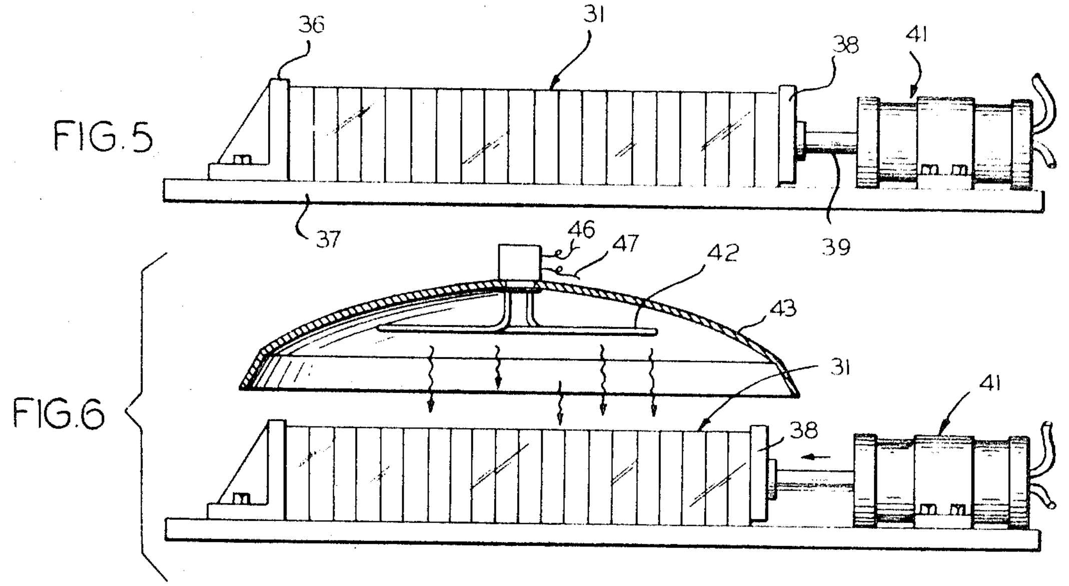
FIG. 5 is a view in elevation of a compression mechanism which can be employed with the type of stack shown in FIG. 4.
FIG. 6 is a view of the compression mechanism in operation in conjunction with a heater which shrinks the wrapper about the stack.
Figure 9:
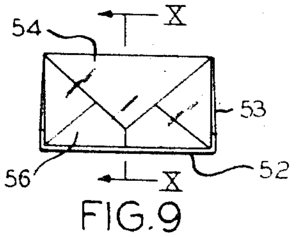
FIG. 9 is an end elevational view of the completed package.

The package 31 illustrated in FIG. 4 includes 20 unit packages, wrapped in a heat shrinkable film 32 provided with overlapping end flaps 33 and 34. As illustrated in FIG. 5, this aligned stack of unit packages is positioned with one end abutting against a fixed stop 36 on a platform 37, and being compressed by means of a piston 38 disposed on a shaft 39 which is operated by an air cylinder 41 or similar device for moving the piston 38 to compress the package 31, and retract it after sealing.

As shown in FIG. 6, while the package 31 is being compressed by the piston 38, the package 31 is being simultaneously heated by means of an electrical heating element 42 disposed within a reflector 43 and energized from a suitable source of power by means of conductors 46 and 47. The heat radiated by the electrical heating element 42 is sufficient to shrink the film 34 into close conformity with the package 31 which is still under compression. The end flaps 33 and 34 may simultaneously be heat sealed together or adhesively secured in a subsequent operation.

Figures 7, 8:
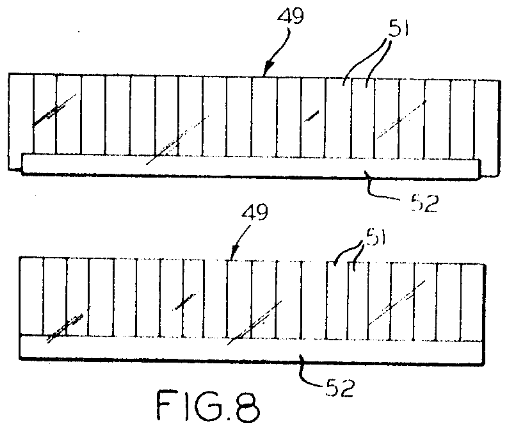
FIG. 7 is a view in elevation of a modified form of the invention, with the unit packages being supported within a tray prior to compression.
FIG. 8 is a view similar to FIG. 7 but illustrating the articles after compression.
Figure 10:
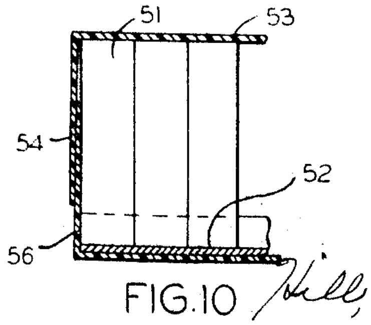
FIG. 10 is a fragmentary enlarged cross-sectional view taken substantially along the line X–X of FIG. 9.

In the form of the invention illustrated in FIGS. 7 through 10 inclusive, a package 49 is made up consisting of the individual unit packages 51 slidably mounted along an open ended tray 52, the entire package consisting of the unit packages 51 and the tray 52 being wrapped with a heat shrinkable film 53 having end flaps 54 and 46 thereon. The package is then put into a suitable compression mechanism, such as the type illustrated in FIGS. 5 and 6, to compress the packages 51 so that they are flush with the end of the tray 52, as illustrated in FIG. 8. Then, or simultaneously therewith, the film 53 is subjected to a shrinking operation by the application of heat, whereupon it shrinks to conform to the tray and package combination, and holds it in compressed relation. At the same time, the end flaps 54 and 56 may be heat sealed together. Then, when the package is opened by the user, individual packages 51 may be removed therefrom while still leaving a receptacle for holding the remaining packages.

Since the articles in the package of the present invention are snugly fitted together, bowing of the package is prevented, thereby increasing the load carrying capacity of the packaged units.

Physical testing of packages produced according to the present invention showed that they will take a higher maximum load with lower deflection than packages produced by other means. To illustrate, 48 individual packages of gelatin in their regular paper cartons where packaged with a heat shrinkable polyvinyl chloride film of 1½ mils in thickness, and the outer wrap was thereupon shrunk by means of hot air, but no compression of the contents was employed. Additional samples were made using the identical number of gelatin packages of the same orientation, and wrapped in a 47 pound glue sealed linerboard material under compression as described in Wilson U.S. Pat. No. 2,962,848. Still other samples were made using the same orientation of packages, wrapped in the 1½ mil heat shrinkable polyvinyl chloride, but having the packages compressed prior to shrinking of the film onto the packages. The compression was accomplished in a compression machine having a movable upper platen travelling at a constant rate of ½ per minute, and the packages were compressed until maximum bearing load has been achieved.

The samples which had been packaged with the shrink film alone evidenced an average deflection of 0.165 inches. The packages which were compressed, but which did not employ the heat shrinkable film also evidenced an average deflection of 0.165 inches. The materials produced according to the present invention, and produced by compression of the contents and shrinking of the plastic film evidenced an average deflection of 0.145 inches. Projecting these figures based upon the deflection data, the maximum load for the packages of the present invention would be in the area of about 3,500 to 3,700 pounds, whereas the maximum load for the other samples averaged about 3,230 pounds for the units packaged in the shrink film without compression, and 3,025 pounds for those compressed but not wrapped with the shrinkable film.

From the foregoing, it should be understood that the process of the present invention provides an substantially improved consolidation of unit packages which can withstand more load than packages produced with other techniques.

It should also be understood that various modifications can be made to the described embodiments without departing from the scope of the present invention.

I claim:

1. An apparatus consolidating a plurality of individual package units wrapped together in a heat shrinkable material into a rigid single compressed bundle comprising conveyor means transporting said plurality of units into a compressor means associated with said conveyor means, said compressor means compressing said units into a tightly compressed bundle, and a heating means operating on the heat shrinkable film of the bundle of units being conveyed on said conveyor means to said entire film and thereby shrink it into conformity with the tightly compressed bundle to rigidify said bundle, said compressor means including a pair of opposed spaced upstanding endless belts having an inlet end and an outlet end, said belts being spaced further apart at said inlet end then at said outlet end whereby as said belts propel the wrapped plurality of package units from said inlet end to said outlet end, they exert a substantial compressive force on said plurality of package units causing a significant amount of compression to take place but short of the force which would crush or mutilate the packaged units but which force is sufficient to rigidify said bundle, said belt being driven from a first end roller at said inlet end and a second roller at said outlet end, an intermediate roller being positioned intermediate said first and second rollers, said opposing belts converging toward each other in the area from said first roller to said intermediate roller and running substantially parallel to each other in the area from said intermediate roller to said second roller.

2. An apparatus according to claim 1 wherein said heating means is located generally between said opposing belts and between said intermediate roller and said second roller.

3. An apparatus according to claim 2 wherein said heating means is at least two hot air distributors, at least one of said distributors being located each above and below said conveyor means whereby said bundle is immersed in hot air.

4. An apparatus according to claim 2 wherein said heating means is operative to heat said heat shrinkable film to 300° F.

5. An apparatus according to claim 1 wherein said package includes a tray which is wrapped, along with said units in said heat shrinkable film, said tray being of a length equal to the distance between said substantially parallel belts in the area from said intermediate roller to said second roller.

6. An apparatus for consolidating individually packaged units into a rigidified package comprising a compression means arranged to apply compressive pressure against a stack of said units wrapped in a heat shrinkable film, and heating means being arranged to heat the wrapper during such compression and thereby shrink the wrapper into conformity with the compressed stack, said compression means comprising a fixed stop and movable piston between which the package is arranged to be compressed and rigidified, said heating means including a heat radiating reflector disposed in operative proximity to said compression means, said individual units being slidably mounted on a tray, which tray is wrapped, along with said units, in said heat shrinkable film, said compression means being operable to compress said packages to be flush with the ends of the tray so that when said film shrinks it retains said units in their compressed state.